June 13, 1950     W. B. JOHNSON     2,511,470
THREAD CUTTER
Filed March 3, 1945
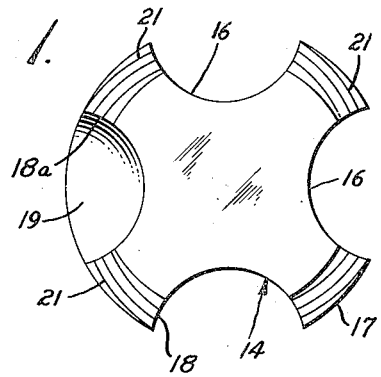
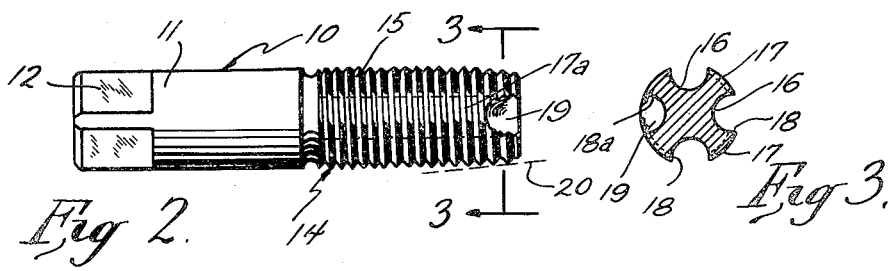
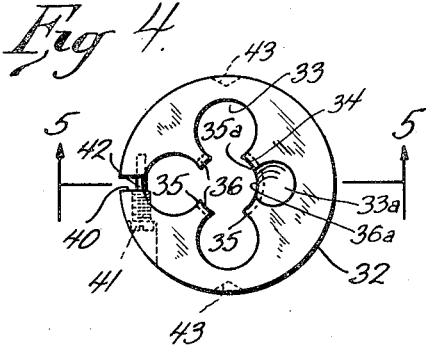
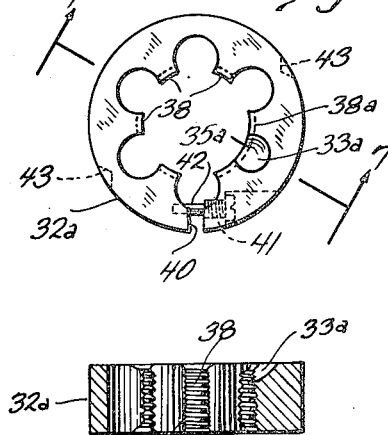
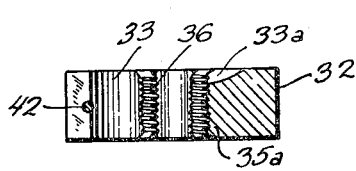
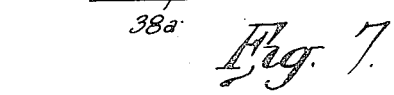
INVENTOR.
William B. Johnson
BY
Watson D. Harbaugh
Atty.

Patented June 13, 1950

2,511,470

UNITED STATES PATENT OFFICE 2,511,470

THREAD CUTTER

William B. Johnson, Wheaton, Ill.

Application March 3, 1945, Serial No. 580,838

10 Claims. (Cl. 10—118)

The present invention relates to an improved apparatus, such as a tap or die, for cutting threads upon a member made of a machinable material and relates to certain improvements over my invention disclosed in application Serial No. 487,591 filed May 19, 1943, and issued as Patent No. 2,379,908, July 10, 1945, reference to which is hereby made.

The snugness with which two mating threads on two threaded elements nest is called the fit and five distinct classes of fits have been established for the purpose of insuring the interchangeable manufacture of screw thread parts throughout the country. A "class one" fit is a loose fit. A "class two" fit is a free fit. "Class three" is a medium fit. "Class four" is a close fit, while "class five" is a wrench fit.

To insure this interchangeability of screw thread parts, there is an intentional difference provided in the dimensions of the mating parts which difference is called allowance. This relates to the minimum clearance permitted and represents the tightest permissible fit, i. e. the fit permitted between the largest expected male member mated with the smallest expected female member. In order to control what is to be expected regarding maximum and minimum sizes, a "tolerance" criterion is set up to determine the amount of variation permitted in the size of each of the two parts.

Whether or not the rated class fit is maintained is a question then of allowance and the smoothness of the finish upon the surfaces of ridges which contact each other. If this finish is rough, a higher class fit is sacrificed because allowance must be sacrificed to enable the threads to mate in spite of the roughness. The smoother the finish, the closer the allowance can be held and still have the parts mate, and thereby the higher is the class fit that can be attained.

Threads are generally cut by taps or dies, depending upon whether the thread is an internal thread or an external thread respectively. A tap is usually a cylindrical bar of steel with one or more threads formed around it and with grooves or flutes cut lengthwise in it to intersect or undercut the threads and thereby form cutting edges at the leading edges of the interrupted threads which cut an internal ridge or thread. A die is usually a flat piece of steel internally threaded and provided with grooves or flutes intersecting the threads to form cutting edges which cut an external thread. Those portions which remain between the flutes are called the lands.

In order to spread the cutting load over more than those cutting edges which are present in one turn of the thread, the starting end of the tap or die has its thread turns chamfered to provide a lead which divides the total cutting load between the number of cutting edges in a turn multiplied by the number of thread turns affected by the chamfer. With this arrangement, each cutting edge cuts a portion of the total material from the member being threaded until the depth of the engagement covers the chamfered portion. For instance, if the chamfer covers three turns, the cutting edges present in these three turns do not complete the thread they are cutting until the tap or die is rotated three turns with respect to the member being threaded. Furthermore, if there are four cutting edges per turn, there are four cutting edges for each of the three turns over which the cutting load is distributed, namely, twelve cutting edges.

The flutes in the tap not only provide cutting edges, and a passage for the lubricant to flow to the cutting edges, but also clearance for the removal of chips made by the cutting edges. In order to have as large a flute as possible for maximum clearance of the chips, the flutes conventionally are spaced at equal distances around the thread.

The invention disclosed in the application referred to utilizes a wide land of approximately 90° along with a plurality of equally spaced narrow lands to burnish the cuts of the narrow lands preceding it progressively as the cut is advanced in the work piece. This wide land not only served to burnish the thread as it was formed but also served as a lead for the tap and as a steady rest for the other narrow cutting edges so that they would not be broken or fractured if they happen to hit a hard spot. Furthermore, the stock constituting the wide land served as a rigidifying element for the tap to prevent deflection thereof under variations in the torque effort exerted upon or by the tap. This rigidifying effect prevented a flexing of the tap which might permit a very heavy load to be concentrated upon a limited number of cutting edges. Thus the tap or die was supported against hunting which occurs when threading a stringy or ductile material.

My earlier invention enabled a much higher class fit to be maintained for the parts being threaded since closer tolerances could be held because of the increased and uniform smoothness of the thread finish. Furthermore, higher class fits could be developed in a single cutting operation without need for retapping to close tolerances.

However, in my earlier invention some difficulty was experienced in sharpening the taps correctly since the wide land was relieved only slightly, if any, as compared with the narrow lands which were relieved substantially. Furthermore the tap in sharpening had to be chamfered so that the cutting edge on the wide land was the last to cut during the threaded operation.

In the present invention the advantages of my earlier invention are kept with the added advantage of the tap or die being capable of being sharpened and chamfered in the conventional manner without regard to which cutting edges are the first to cut.

Not only does the present invention have the characteristics of my earlier invention but it also has an extra cutting edge in the wide land which extends to the depth of the chamfer so that a substantial relief may be had for both divisions of the wide lands separated by the flute.

A further object of the invention is to provide a thread cutter construction which accomplishes all the improved results of my former invention, yet can be sharpened and used like any conventional thread cutter.

These being among the objects of the present invention, other and further objects will be apparent from the drawing, the description relating thereto and the appended claims.

Referring now to the drawing:

Fig. 1 is an enlarged end view of a tap shown in Fig. 2 embodying the invention;

Fig. 2 is a side elevation of the tap shown in Fig. 1 embodying the invention;

Fig. 3 is a section taken upon line 3—3 of Fig. 2;

Fig. 4 is a top view of a die embodying the invention;

Fig. 5 is a section taken upon line 5—5 in Fig. 4;

Fig. 6 is a top view of another die embodying the invention; and

Fig. 7 is a sectional view taken upon the line 7—7 in Fig. 6.

In the practice of the invention, it is preferred to provide a plurality of equally spaced cutting edges which successively contact and cut a work piece over the chamfered area of the tap after which one of the cutting edges is eliminated and in its place the cutting edge preceding it is followed by one wide land which burnishes the work piece over an area approximately the circumferential distance from one cutting edge of one land to the trailing edge of the next land as the tap advances into the work piece. If the chamfer affects only two threads it is desirable to have the flute providing the extra cutting edge extend a little bit deeper into the body of the wide land axially to provide room for sharpening and shaping the rake angle of the extra cutting edge. On the other hand, if the chamfer affects three or more threads, it is not necessary that the short flute providing the extra cutting edge extend beyond the first full thread upon the wide land, it being desirable to have the short flute as short as possible so that the burnishing action of the wide land can begin where the chamfer ends.

Otherwise the relationship between the wide and narrow lands regarding the relative area is preferably determined as near as possible by the following criteria, namely, that the wide land should occupy approximately the area of two narrow lands and the intermediate flute, it being possible with the present invention to provide a wide land appreciably wider than that considered to be the optimum in my earlier invention since the tap or die, if it is a taper thread cutter, can be relieved to a constant radius throughout the length of the threads on the wide land while the threads upon the wide land are already of a constant radius if the thread cutter is designed to cut a straight thread. In either instance the binding action of the wide land is minimized since it is not effective until the full thread is cut and its main purpose is to burnish the thread and serve as a lead screw and steady rest. On the other hand where more than four equally spaced cutting edges are provided at the chamfer, the wide land may approach a minimum width less than a 90° angle without departing from the advantages of my earlier invention.

The burnishing action provided by the wide land removes slight irregularities that might occur in the cuts of the chamfered threads and thereby prevents the pyramiding of such irregularities as far as subsequent clean up cutting edges are concerned once the wide land engages the work piece.

Having thus described the process of the invention, the invention is characterized by a tap or die construction having three or more cutting edges and lands among which one of the lands occupies approximately 90° of the circumference of the tap or die throughout the unchamfered portion of the thread while the chamfered end portion presents to the work piece four or more equally spaced cutting edges.

As more particularly shown in the drawing, a tap 10 having a shank 11 squared as at 12 to be received in a holder 13 (Fig. 1) has a body portion 14 provided with a helical thread 15. Flutes 16 are cut longitudinally along the body portion crosswise the threads and deep enough to section the threads upon lands 17 to provide cutting edges 18 upon the leading edges of the thread sections. One of the lands 17a is of sufficient peripheral expanse between adjacent flutes to occupy an arc of approximately 90° or an area equal to the width of two of the lands 17 and an intervening flute 16, whichever is greater. It is preferred that this arc be very little less than 90°, if any, while an arc greater than 90° is not objectionable up to approximately 120° in small taps or dies.

The cutting or starting end of the tap 10 is chamfered as at 20 to provide a lead of several thread turns and with the first cutting edge disposed any place upon the circumference convenient to the operator or machine sharpening the tap. The chamfer shown in Fig. 2 covers approximately three threads and preferably in the exact center of the wide land a short flute 19 is cut to a depth sufficient to provide an auxiliary cutting edge 18a for the chamfered threads. Over the chamfered portion the land portion trailing the cutting edges is relieved in a radial direction as at 21 so that the cross sectional contours of the chamfered threads diminish progressively away from the cutting edge. Beyond the short flute 19 the threads upon the wide land are of a constant cross sectional contour throughout their length. If the thread is on a plug tap the pitch diameter is uniform throughout the length of the wide land threads and if the thread is on a taper tap, the threads on the wide land are relieved to a uniform radius with respect to the axis of rotation of a taper tap.

Thus once the full depth of the thread being cut is reached by the chamfered portion, the thread on the wide land following its cutting edge is of the same dimension throughout its depth to ride solidly in the groove provided by the chamfered portion of the tap. With this construction the wide land serves as a lead thread for the chamfered threads once it engages in the work and being wide enough so as not to be affected by irregularities caused by the chamfered cutting edges, the wide land serves as a steady rest for the cutting edges upon the narrow lands and burnishes the completed threads as firmly supported against chatter or lateral yield.

Furthermore the increased stock provides the tap with a greater structural rigidity under torque strains. The resulting thread is one which can be rated one or more class fits higher than that provided with a conventional tap.

The tap may be supported in any one of a number of machines for use in any one of several ways as disclosed in said Patent No. 2,379,908, reference to which is hereby made.

The principle described in connection with the taps, both tapered and straight thread taps, applies also to dies, reference being made to Figs. 4 and 6 where in Fig. 4 flutes 33 are made crosswise of the thread 34 to provide cutting edges 35 upon lands 36 with a wide land 36a occupying approximately 90° of one turn of the thread upon die 32.

In Fig. 6 is shown a die 32a having a construction wherein four narrow equally spaced lands 38 are provided exclusive of the wide land 38a. Otherwise, the dies shown in Figs. 4 and 6 are split as at 40 and threaded as at 41 to receive an adjusting screw 42 to determine the diameter of the thread to be cut and the dies are provided with locking depressions 43 to support the dies in suitable die holders (not shown) that can be received by the holder 24 for use in a way similar to that described in connection with the tap 10.

As with the tap 10, a short flute 33a is cut in the wide land to the depth of the chamfer to provide an extra cutting edge 35a for the chamfered portion of the die.

The size of the tap or die is immaterial so long as the relationships discussed are maintained, the additional advantage existing with the larger sizes of more cutting edges being available. In fact, the design shown in Fig. 6 illustrates the arrangement and number of cutting edges that are preferred for a die which is next in size above the size of the die shown in Fig. 4.

Furthermore, the principle set forth herein and discussed applies to taps or dies with spiral flutes and taps and dies designed to cut pipe threads, and the claims are to be so construed, if not otherwise limited.

Having thus described the process and the preferred embodiments of the invention for threading a machinable material, it will be apparent from the description and the drawing how the objects and purposes of the invention are accomplished. However, since in some respects it is not possible to account fully for the improved and unexpected results which are obtained by the method and apparatus of this invention, it should be understood that any attempt to analyze the theory which is believed to be responsible for these results is to be construed not as defining a mode of operation but merely as a possible explanation of certain physical and metallurgical phenomena which have been observed. Consequently, although certain preferred embodiments of the invention have been shown and described herein, it will be apparent to those skilled in the art that various uses, modifications and changes can be made without departing from the spirit and substance of the invention, the scope of which is commensurate with the appended claims.

What is claimed is:

1. A thread cutter having its starting end chamfered including a plurality of equally spaced relatively narrow threaded cutter lands and a wider land occupying approximately 90° of arc, said lands being separated by longitudinal flutes which provide undercut edges for the leading edges of the cutting lands and the wide land being fluted at its starting end to the depth of its chamfered portion to provide an extra cutting edge.

2. A thread cutter having its starting end chamfered including a plurality of equally spaced relatively narrow threaded lands and another threaded land occupying approximately 90° of arc, said narrow lands being separated by longitudinal flutes which provide undercut edges for the leading edges of the lands and the chamfered end of the other land being bifurcated by a short flute extending to approximately the depth of the chamfer upon the other land.

3. A thread cutter including a plurality of equally spaced relatively narrow threaded lands and a wide land, said narrow lands being separated from each other and from the wide land by long flutes which undercut the threads and provide cutting edges at the leading edges of the lands, said lands being chamfered at the starting end of the cutter, and said wide land being divided into two cutting edges by a short flute to provide narrow lands extending the length of said chamfer, said two narrow lands being radially relieved over their chamfered portion.

4. A thread cutter for a machinable material comprising a member provided with a thread thereon chamfered at its starting end and sectioned into a wide land and a plurality of relatively narrow lands by longitudinally disposed flutes deeper than the thread and forming cutting edges on the leading edge of each land, said wide land being divided over its chamfered portion by a short flute into two narrow lands, said first mentioned narrow lands and said two narrow lands being equally spaced with respect to each other about the circumference of said thread cutter.

5. A thread cutter for a machinable material comprising a member provided with a thread thereon chamfered at its starting end and sectioned into a wide land and a plurality of relatively narrow lands by longitudinally disposed flutes deeper than the thread and forming cutting edges on the leading edge of each land, said wide land being divided over a minor portion of its length including its chamfered portion into two narrow lands by a short flute, said first mentioned flutes and said short flute being equally spaced with respect to each other about the circumference of said thread cutter, said two narrow lands being radially relieved behind their cutting edges.

6. A thread cutter for a machinable material comprising a member provided with a thread thereon chamfered at its starting end and sectioned into a wide land and a plurality of relatively narrow lands by longitudinally disposed flutes deeper than the thread and forming cutting edges on the leading edge of each land, said wide land being of an accurate width approximately equal to an arc including two of the narrow lands and the space between them and being divided over its chamfered portion by a short flute providing an extra cutting edge, said first mentioned flutes and the short flute being equally spaced with respect to each other over the remaining portion of the thread turn, and all narrow lands being radially relieved behind the cutting edges at the chamfered portion.

7. A thread cutter for a machinable material comprising a member provided with a thread thereon chafered at its starting end and divided throughout its length by substantially identical longitudinal flutes into a plurality of lands in excess of two, one only of which occupies an arc of approximately 90° of one turn of the thread, said one land being divided by a short flute into two narrow short lands extending the length of the chamfered portion thereof, said flutes forming cutting edges on the lands.

8. A thread cutter for a machinable material comprising a member provided with a thread thereon chafered at its starting end and divided throughout its length by substantially identical longitudinal flutes into a plurality of lands in excess of two, one only of which occupies an arc approximately equal to one including two other lands and the space between them, said one land being divided by a short flute into two narrow lands over the chamfered portion thereof, said flutes forming the cutting edges on the lands.

9. A tap for a machinable material comprising an elongated member carrying a threaded portion chafered at its starting end and divided longitudinally throughout its length by longitudinally disposed flutes into a plurality of lands in excess of two, one of said lands being approximately as wide throughout a portion of its length as two of the other lands and the space between them, said wide land terminating at its cutting end in two narrow lands extending approximately the length of the chamfer.

10. A thread cutter for a machinable material characterized throughout a portion of its length by a plurality of lands in excess of two formed by flutes undercutting the leading edges of the lands to provide cutting edges, one of said lands being equal in width to two adjacent narrow lands and their included flute terminating at its starting end in two short lands divided by a short flute undercutting the trailing one of the two short lands to provide a cutting edge thereon, said narrow lands and the two short lands being equally spaced around the circumference of the cutter.

WILLIAM B. JOHNSON.

REFERENCES CITED

The following references are of record in the file of this patent:

UNITED STATES PATENTS

| Number | Name | Date |
| --- | --- | --- |
| 306,783 | Smart | Oct. 21, 1884 |
| 343,102 | Bowden | June 1, 1886 |
| 1,488,271 | Miller | Mar. 25, 1924 |
| 1,718,536 | Dalzen | Oct. 20, 1929 |
| 2,058,351 | Pruitt | Oct. 20, 1936 |
| 2,273,598 | Shafer | Feb. 17, 1942 |
| 2,379,908 | Johnson | July 10, 1945 |

FOREIGN PATENTS

| Number | Country | Date |
| --- | --- | --- |
| 640,731 | Germany | Dec. 29, 1931 |